US012633708B2

(12) United States Patent
Fong et al.

(10) Patent No.: US 12,633,708 B2
(45) Date of Patent: May 19, 2026

(54) GROUNDING FUSED LOAD RECEPTACLE

(71) Applicant: ABB Schweiz AG, Baden (CH)

(72) Inventors: Robert Fong, Bethlehem, PA (US); George R. Hydock, Mount Bethel, PA (US)

(73) Assignee: ABB Schweiz AG, Baden (CH)

( * ) Notice: Subject to any disclaimer, the term of this patent is extended or adjusted under 35 U.S.C. 154(b) by 397 days.

(21) Appl. No.: 18/332,132

(22) Filed: Jun. 9, 2023

(65) Prior Publication Data

US 2024/0413594 A1 Dec. 12, 2024

(51) Int. Cl.
*H01R 13/688* (2011.01)
*H01R 103/00* (2006.01)

(52) U.S. Cl.
CPC ....... *H01R 13/688* (2013.01); *H01R 2103/00* (2013.01)

(58) Field of Classification Search
CPC .......................... H01R 13/688; H01R 2103/00
See application file for complete search history.

(56) References Cited

U.S. PATENT DOCUMENTS

| | | | | |
|---|---|---|---|---|
| 3,512,118 | A * | 5/1970 | Leonard | H01R 13/53 337/201 |
| 7,572,133 | B2 * | 8/2009 | Hughes | H01H 33/666 439/181 |
| 7,695,291 | B2 * | 4/2010 | Hughes | G01R 31/74 439/88 |
| 8,172,596 | B2 | 5/2012 | Siebens | |
| 8,616,908 | B2 | 12/2013 | Siebens | |
| 9,124,015 | B2 | 9/2015 | Siebens | |
| 10,460,886 | B2 * | 10/2019 | Jones | H01H 85/143 |
| 2022/0020513 | A1 * | 1/2022 | Kumar | H01C 1/028 |

* cited by examiner

*Primary Examiner* — Briggitte R. Hammond
(74) *Attorney, Agent, or Firm* — Fitch Even Tabin & Flannery LLP

(57) ABSTRACT

An electrical load receptacle including a first end with a first conductor receiving opening, a second end with a second conductor receiving opening, and a first conductive connector arranged in the first end and configured to electrically connect a first utility conductor to a fuse. A second conductive connector is arranged in the second end and configured to electrically connect a second utility conductor to the fuse. A grounding interface is configured to receive a grounding pin for grounding the second conductive connector.

14 Claims, 3 Drawing Sheets

GROUNDING FUSED LOAD RECEPTACLE

FIELD

The present disclosure relates to an electrical load receptacle.

BACKGROUND OF THE INVENTION

Conventionally, utility line maintenance must be performed by trained utility line crews. In order to ensure the safety of crew members and protection of utility line equipment, crew members must be trained to take a variety of safety precautions and follow safety protocols and procedures. For example, to avoid the possibility of electrocution of crew members, branches of utility circuits being serviced by the crew members are typically grounded prior to servicing. In some instances, capacitive test points within utility equipment may be used to indicate to crew members whether a particular branch of the utility circuit is safe. In some instances, crew members are instructed to deactivate utility circuits prior to circuit grounding to safeguard against harming crew members.

Utility line maintenance, however, is performed based on a variety of assumptions prior to a determination being made as to whether performing the maintenance is safe or not. In cases where capacitive test points are used, for example, an assumption must be made that the capacitive test point is functioning properly to thereby provide a reliable indication to the crew members. Reliance on safety procedures often requires assumptions that one or more other crew members have performed safety procedure steps, such as an assumption that a remote crew member has completed deactivation of a utility circuit.

Accordingly, there is a need for improved utility line maintenance safety and utility line devices.

BRIEF SUMMARY OF THE INVENTION

An electrical load receptacle comprising a first end with a first conductor receiving opening, a second end with a second conductor receiving opening, and a first conductive connector arranged in the first end and configured to electrically connect a first utility conductor to a fuse. A second conductive connector is arranged in the second end and configured to electrically connect a second utility conductor to the fuse. A grounding interface is configured to receive a grounding pin for grounding the second conductive connector.

BRIEF DESCRIPTION OF THE SEVERAL VIEWS OF THE DRAWINGS

Subject matter of the present disclosure will be described in even greater detail below based on the exemplary figures. All features described and/or illustrated herein can be used alone or combined in different combinations. The features and advantages of various implementations will become apparent by reading the following detailed description with reference to the attached drawings, which illustrate the following.

DETAILED DESCRIPTION OF THE INVENTION

Aspects of the present disclosure include load receptacles for providing electrical connections in utility lines. In an embodiment, a load receptacle is provided which is configured for permanent installation in a buried utility line and facilitates safe maintenance during servicing of the buried electrical utility line. In particular, an integrated grounding interface is provided in a load receptacle to provide an improved level of safety to the load receptacle. A cap is provided over the integrated grounding interface to allow for direct testing of a utility circuit. In some embodiments, the various advantages described herein may also be realized in a load receptacle which is installed in an above-ground utility line, such as on or near a utility pole. Aspects of the present disclosure also include methods for determining that a utility circuit is deactivated so that a grounding accessory can be installed via the grounding interface, and methods for performing maintenance on a utility line using a load receptacle with an integrated grounding interface.

Aspects of the present disclosure provide a load receptacle that is smaller in terms of its length and other outer dimensions than conventional load receptacles. Furthermore, the shape and design of the load receptacle according to aspects of the present disclosure, such as an elbow-shaped load receptacle, minimizes overall stack height within a pad mount electrical transformer and also protects utility equipment. In applications where space is at a premium, aspects of the present disclosure thus provide the necessary protection to utility equipment while maintaining a smaller physical footprint and at lower cost. Aspects of the present disclosure also provide a load receptacle that provides added protection to maintenance workers, as safe operational state of the utility line and the receptacle can be confirmed and/or ensured without requiring communication with remote utility workers and/or systems and without reliance on safety assumptions.

Figure 1:
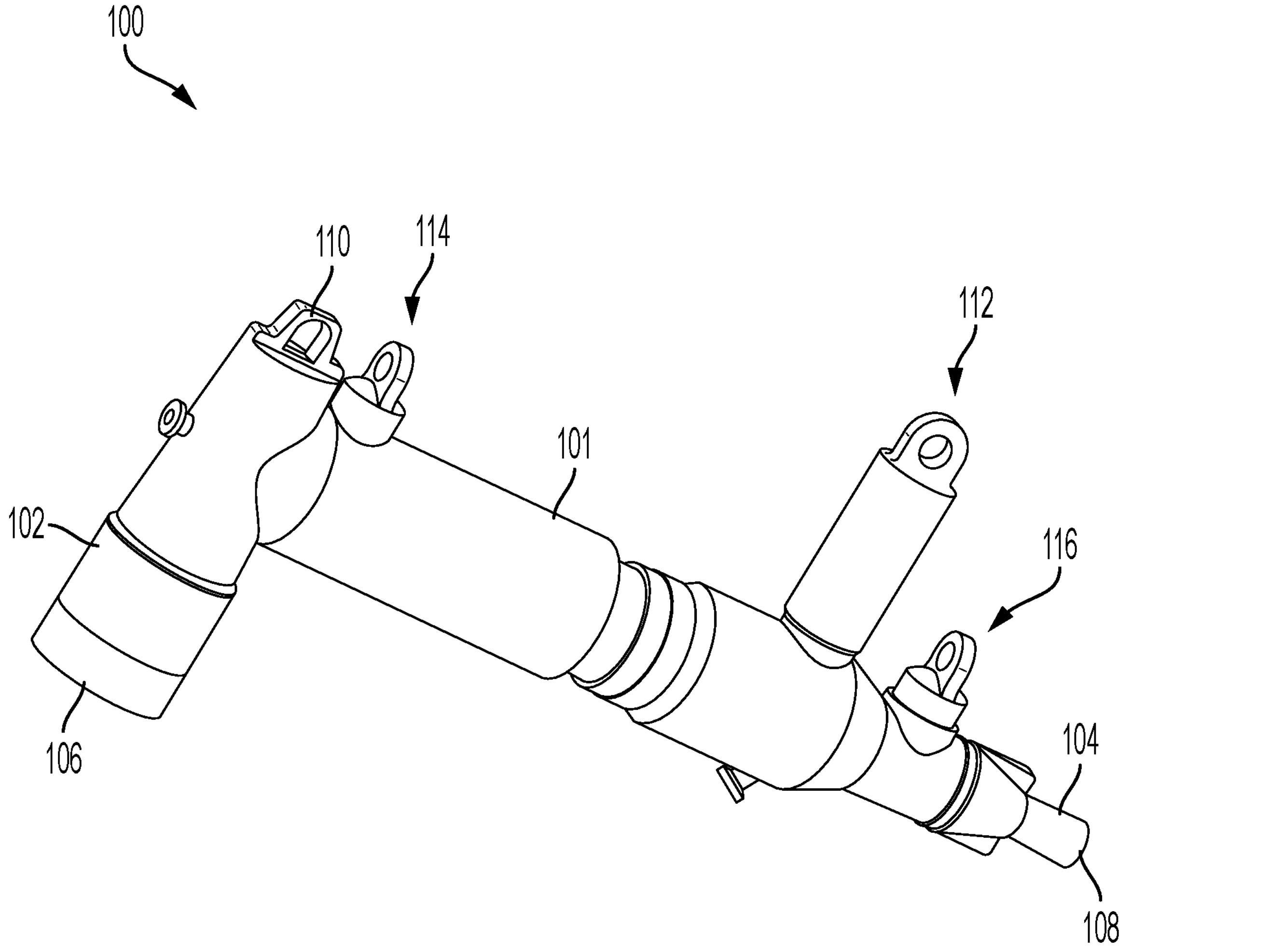
FIG. 1 illustrates a load receptacle according to an embodiment of the present invention.

FIG. 1 illustrates a load receptacle 100 according to an embodiment of the present invention. The load receptacle 100 has an outer shield 101 that at least partially covers the outer surface of the receptacle 100, thereby insulating the internal surfaces and/or components that may be arranged within the receptacle 100 from the elements. The load receptacle 100 includes a first end 102 with a first conductor receiving opening 106. The load receptacle 100 also includes a second end 104 on an opposite end of the receptacle. The second end 104 includes a second conductor receiving opening 108. The first end 102 and second end 104 are electrically connected to one another via conductors arranged internally in the load receptacle 100, as will be described in greater detail below with reference to FIG. 2. The first conductor receiving opening 106 and the second conductor receiving opening 108 are each configured to receive first and second electrical conductors, respectively, thereby facilitating electrical connection of the first and second electrical conductors to one another. The first and second electrical conductors may be cables that form part of a utility line or electrical utility infrastructure. The first and/or second conductor receiving openings 106, 108 may be configured as an electrical interface that is compliant with Institute of Electrical and Electronics Engineers (IEEE)

386-2016, which provides standards for separable insulated connector systems for power distribution systems rated for 2.5 to 35 kV.

The load receptacle 100 includes a pulling eye 110 arranged at a corner formed by the elbow-like shape of the receptacle 100. The pulling eye 110 is arranged at the corner to facilitate removal of the receptacle from an installation point or carrying of receptacle 100 from one location to another. The pulling eye 110 is therefore configured to have sufficient strength and dimensions to withstand a force at least equivalent to the weight of the receptacle 100, together with a safety factor. In some embodiments, the pulling eye 110 is further configured with sufficient dimensional and material strength to withstand a forces required not only to carry the receptacle 100, but to dislodge it from an installation position or from within a motion-resistant environment, such as from within earth in which the receptacle 100 is at least partially buried.

The load receptacle 100 includes a grounding interface 112, the particular features of which will be described hereafter with reference to FIG. 2. The grounding interface 112 protrudes from the body of the receptacle 100 to provide easy access to a maintenance worker and to provide sufficient space to ensure de-energizing of the receptacle 100 under proper conditions.

The load receptacle 100 also includes a first testing point 114 and a second testing point 116 on substantially opposing ends of the receptacle. The particular features of the first and second testing points 114, 116 will be described in greater detail hereafter with reference to FIG. 2.

Figure 2:
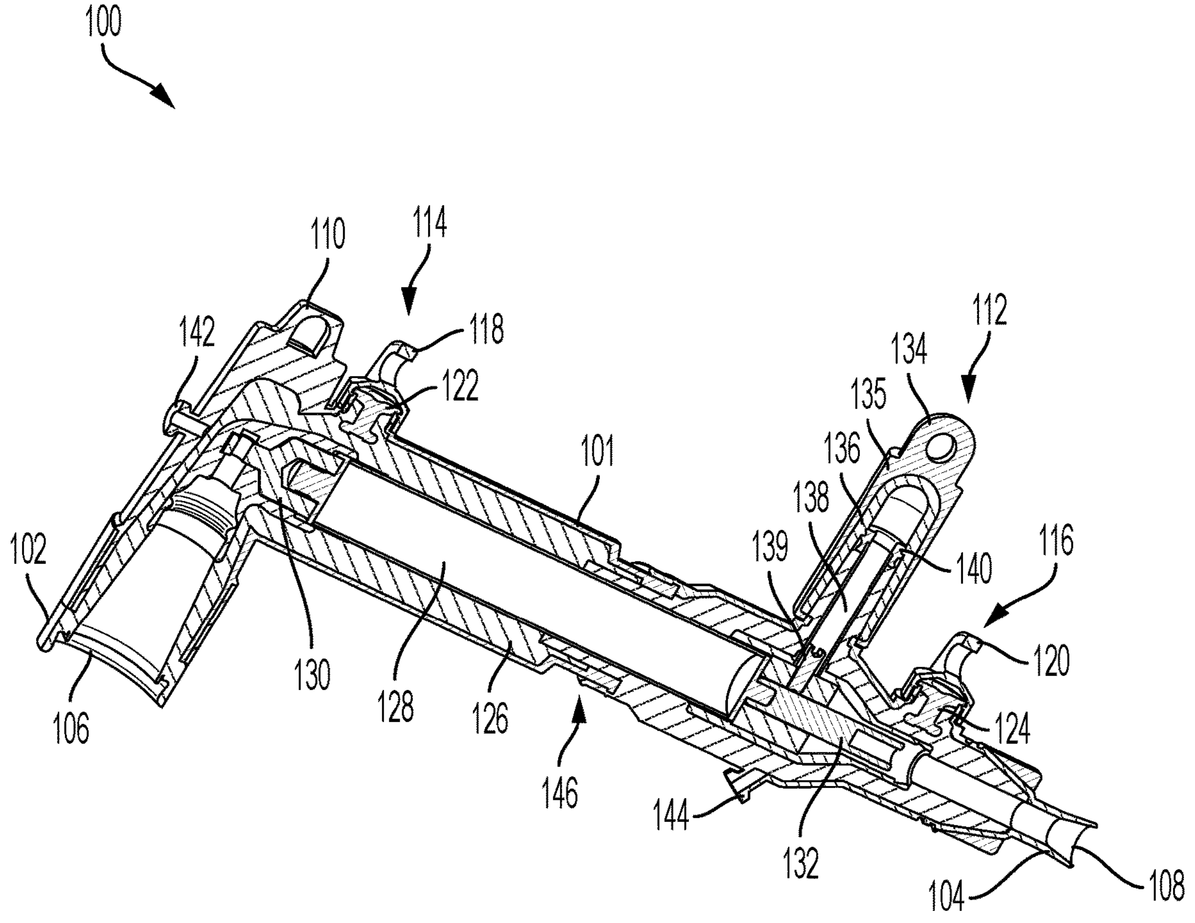
FIG. 2 illustrates a cross-sectional view of a load receptacle according to an embodiment of the present invention.

FIG. 2 illustrates a cross-sectional view of the load receptacle 100 illustrated in FIG. 1. The first and second testing points 114, 116 each include respective pulling apertures 118, 120. The pulling apertures 118, 120 facilitate removal of an insulating cover from each of the first and second testing points 114, 116 by a maintenance worker. Removal of the insulating covers allows access to capacitive testing points 122, 124 within the first and second testing points 114, 116. The capacitive testing points 122, 124 represent spaces that protrude into the body of insulating body 126 of receptacle 100, thereby allowing a more accurate measurement of capacitance based on electrical current passing through conductors within the receptacle 100.

As illustrated in FIG. 2, the receptacle 100 includes an outer shield that makes up most of the external surface of the receptacle 100 and protects and insulates the receptacle 100 from the elements. Internal to the outer shield 101, an insulative inner housing 126 is arranged along the length of the receptacle 100 with sufficient thickness to ensure that electrical conductors within the receptacle 100 are fully covered and protected from unintended short-circuiting with external conductors or with the environment. The insulative inner housing 126 may be formed by molding using an insulative rubber or epoxy material. The receptacle 100 also includes a fuse 128, first end connector 130, and second end connector 132 within the insulative inner housing 126. The fuse 128 is configured to conduct electricity until a threshold electrical current that breaks the fuse 128 is passed through the fuse 128, thereby providing overcurrent protection to a utility line onto which the receptacle 100 is attached. In some embodiments, the fuse 128 is rated for between 3 to 45 amps. The first and second end connectors 130, 132 are configured to provide an electrical connection between external conductors inserted via first and second conductor receiving openings 106, 108 and the fuse 128. The first and second end connectors 130, 132 may be secured to an inserted conductor using a variety of known methods, including, for example, frictional engagement of the first and second end connectors 130, 132 with inserted conductors and/or crimping.

In some embodiments, the grounding interface 112 of the receptacle is configured to be compliant with American Society for Testing and Materials (ASTM) F855 or one or more standards for temporary protective grounds. The grounding interface 112 includes a pulling aperture 134 that is part of a grounding interface outer shield 135. The grounding interface outer shield 135 surrounds a grounding interface cap 136 that is made of an insulative material. The grounding interface 112 is configured such that if a sufficient force is applied to the pulling aperture 134, the grounding interface outer shield 135 and grounding interface cap 136 may be removed from the receptacle, thereby exposing the grounding chamber 138 and/or components inserted therein. A grounding conductor 139 is arranged in the grounding chamber 138 such that it is electrically connected to the second end connector 132.

The grounding interface 112 further includes a ring 140 configured to support and secure the grounding interface cap 136 in place. The ring 140 may be comprised of a thermoplastic material. As illustrated in FIG. 2, the ring 140 interfaces with the grounding interface cap 136 via an interference fit with ridges that protrude into and correspond with respective indentations on an inner surface of the grounding interface cap 136. Likewise, the grounding interface cap 136 may include one or more protruding ridges that protrude into corresponding indentations on the ring 140. The ring 140 thereby ensures that the grounding interface cap 136 maintains secure arrangement on the receptacle 100 until a sufficient force is exerted via the pulling aperture 134. The ring 140 may be configured to resist loads up to a threshold value sufficient to ensure that only forces intentionally exerted by a maintenance worker on the pulling aperture 134 may remove the grounding interface cap 136, thereby avoiding unintended removal of the grounding interface cap 136 due to environmental conditions or forces. In some embodiments, the ring 140 may interface with the grounding interface cap 136 via other means, such as by a purely frictional interference fit or a threaded connection. The grounding interface cap 136 is configured to maintain a watertight seal with the receptacle. In some embodiments, the watertight seal formed by the grounding interface cap 136 is configured to withstand at least the pressure exerted by water at a depth of 10 feet (approximately 19.1 pounds per square inch). In some embodiments, other removal caps (such as the caps at first and second testing points 114, 116) and outer shield 101 are likewise configured to maintain a watertight seal to ensure functional integrity of the receptacle 100 and protect it from the elements.

The receptacle 100 may further include injection ports 142, 144 via which the material forming the insulative inner housing 126 may be injected into the receptacle 100 during manufacturing of the receptacle 100.

As illustrated in FIG. 2, the receptacle 100 includes a separation point 146 at which the outer shield 101 and insulative inner housing 126 may be separated near a center of the receptacle 100. The separation point represents a location at which each of the outer shield 101 and insulative inner housing 126 may be separated into two separate pieces and at which respective pieces interface with one another to form a watertight seal with one another. The separation point 146 is advantageous in that it allows for a maintenance worker to separate the receptacle 100 at or near the fuse 128. This allows a maintenance worker to carry out visual inspection of the fuse 128 and replacement of the fuse 128 with a new one if it is blown. Upon replacement of a fuse 128, the receptacle can then be re-assembled by bringing together the outer shield 101 and insulative inner housing 126 at the separation point 146. In some embodiments, the outer shield 101 and/or insulative inner housing 126 include an interference fit at the separation point sufficient to secure the receptacle 100 as a single unit until a force sufficient to overcome a threshold lateral force is exerted on the receptacle 100. In some embodiments, the outer shield 101 and/or insulative inner housing 126 includes other securing means, such as threaded connections and/or ridges and recesses similar to those of ring 140 to ensure a sufficient connection of separate pieces is maintained at the separation point 146. In some embodiments, receptacle 100 does not include separation point 146 and the outer shield and insulative inner housing instead includes a single unitary body of material that cannot be separated. In such an embodiment, the receptacle 100 is replaced in its entirety if a fuse 128 is blown.

In a method according to an embodiment of the present invention, the operational state of the receptacle 100 may be tested by removing the insulating cover from each of the first and second testing points 114, 116 by applying a force to each of the pulling apertures 118, 120. Subsequently, a capacitive testing probe is inserted into each of the testing spaces 122, 124 to determine whether a conductor in proximity to each of the testing points 114, 116 within the receptacle is live (i.e. conducting electricity) or dead (i.e. not conducting electricity). If one of the first and second testing points 114, 116 is live and the other is dead, then this is indicative of the fuse 128 having blown (i.e. rendered inoperable by exposure to an electrical current above a threshold current of the fuse). If both testing points 114, 116 are live, then the fuse is fully operational. If both testing points 114, 116 are dead, this may indicate an electrical fault either somewhere within the receptacle 100 or within utility line infrastructure elsewhere either upstream and/or downstream of the receptacle 100.

FIGS. 1 and 2 illustrate a receptacle 100 shaped with an elbow on one end of a fuse 128, thereby forming a substantially 90 degree angle on one end. It will be readily appreciated that other shapes and configurations of the receptacle 100 can be achieved without departing from the spirit of the present invention. For example, the receptacle 100 may be shaped in a linear configuration while maintaining the same general features and performance characteristics of the receptacle 100 described above with reference to FIGS. 1 and 2. It will also be readily appreciated that, depending on the particular implementation of the load receptacle 100 or the needs of a particular utility line, the angle formed by the receptacle may be smaller than 90 degrees or greater than 90 degrees.

Figure 3:
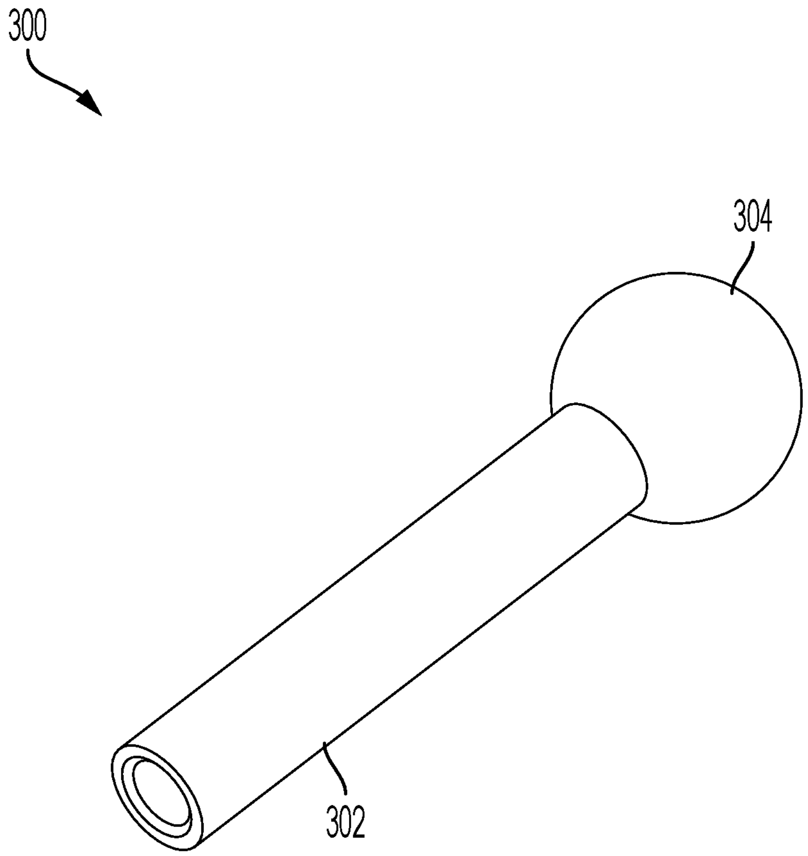
FIG. 3 illustrates a grounding pin of a load receptacle according to an embodiment of the present invention.

FIG. 3 illustrates a grounding pin 300 of an embodiment of the present invention. The grounding pin 300 includes a shaft 302 and a ball 304 at one end of the shaft 302. The grounding pin 300 is configured to be inserted into the grounding chamber 138. In particular, the shaft 302 of the grounding pin 300 is inserted into the grounding chamber 318 such that the shaft may be secured onto the grounding conductor 139. The shaft 302 and grounding conductor 139 may be secured to one another via an interference fit or a threaded connection to ensure secure fitment and electrical connection between the shaft 302 and the grounding conductor 139. Once the shaft 302 is secured to the grounding conductor 139, the ball 304, which is arranged at a sufficient distance away from the end of the shaft 302 such that it protrudes externally of the ring 140, may come into contact with the environment. When the receptacle 100 is buried in earth, the ground pin 300 thus acts to de-energize the conductors in the receptacle, ensuring that it is safe for interaction with a maintenance worker. It will be readily appreciated that while FIG. 3 illustrates a ball 304 on an end of the grounding pin 300, that other shapes may be utilized within the spirit of the present invention that maintain similar performance characteristics to a sphere in terms of de-energizing performance.

In a method according to an embodiment of the present invention, grounding of a conductor may be performed by removing the grounding interface cap 136 of a receptacle 100 to expose a grounding chamber 138 within the receptacle 100. A grounding pin 300 is then inserted and secured to a grounding conductor 139 arranged at least partially within the grounding chamber 138. An end of the grounding pin 300 protruding from the receptacle is then interfaced with a grounding material to de-energize a conductor within the receptacle connected to a utility line. In some embodiments, the grounding material is earth in which the receptacle is configured to be at least partially buried.

In a method according to an embodiment of the present invention, maintenance of a utility line may be carried out by first checking testing points to confirm whether a fuse housed within a load receptacle is operable or has failed. If it is determined that the fuse has failed based on the measurements obtained via testing points of the load receptacle, the load receptacle is arranged in a transformer parking stand. If, through testing of the testing points, it is determined that the load receptacle is safe for repair, the grounding interface can be removed and one side of the load receptacle can be grounded (although the grounded side is not yet live) by insertion of a grounding pin into the grounding interface. This ensures that if the load receptacle is made live for any reason, that it will remain safe for a maintenance worker. Then, the load receptacle can be disassembled for removal and replacement of the fuse or other maintenance tasks may be performed. Once maintenance is complete, the receptacle is re-assembled with the new fuse, the grounding pin is removed, and the grounding interface cap is re-installed.

Embodiments of the present invention are particularly advantageous in that they provide greater safety to maintenance workers, as at least partially described above. In particular, the first and second testing points 114, 116 of the receptacle enable a maintenance worker to directly measure and confirm the operational state of the conductors within the receptacle, allowing the worker to confirm with greater certainty whether the receptacle or one side of the utility line is safe to interact with. In conventional receptacles, a maintenance worker may be required to contact a remote worker or interact with a remotely controlled system to shut down part of the utility line being maintained. Without a direct means for confirming whether the shutdown has been implemented, or whether the shutdown has proceeded for long enough to cause de-energization of the receptacle and/or utility line being maintained, a worker may be required to make a variety of unsafe assumptions before proceeding with maintenance. For example, the worker may have to assume that a remote worker who received instructions de-energized the correct utility line, or that a de-energization command to a control system was properly executed. Embodiments of the present invention, by eliminating the need for some such assumptions, therefore provide increased maintenance work safety. Maintenance procedures can also be carried out more efficiently, as certain safety precautions that were necessitated by safety assumptions are no longer required.

Embodiments of the present invention also provide a receptacle that is more versatile due to its smaller size and its configuration that allows for a simplified fuse replacement procedure. Smaller fuses may thus also be utilized in the load receptacle according to embodiments of the invention.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electrical load receptacle comprising:
- a first end with a first conductor receiving opening;
- a second end with a second conductor receiving opening;
- a first conductive connector arranged in the first end and configured to electrically connect a first utility conductor to a fuse;
- a second conductive connector arranged in the second end and configured to electrically connect a second utility conductor to the fuse;
- a grounding interface configured to receive a grounding pin for grounding the second conductive connector;
- an insulative housing surrounding the first conductive connector, the second conductive connector, and the fuse; and
- an outer shield configured to surround the insulative housing,
- wherein the outer shield includes a first pulling eye secured to a grounding interface cap configured to cover the first grounding interface.

2. The electrical load receptacle of claim 1, wherein the grounding interface includes a grounding conductor configured to electrically connect the second conductive connector to the grounding pin.

3. The electrical load receptacle of claim 2, wherein the grounding conductor includes a threaded connection configured to mate with the grounding pin.

4. The electrical load receptacle of claim 1, wherein the grounding interface is configured to extend orthogonal to the second.

5. The electrical load receptacle of claim 1, wherein the outer shield and the grounding interface cap are configured to provide a water-tight sealing of the grounding interface relative to an external environment, the water-tight sealing rated to withstand pressures exerted by water at a depth of 10 feet.

6. The electrical load receptacle of claim 1, further comprising:
- a first testing interface arranged in the insulative housing and configured to provide for capacitive probing of a first end of the fuse; and
- a second testing interface arranged in the insulative housing and configured to provide for capacitive probing of a second end of the fuse,
- wherein outer shield further includes a first testing interface cap configured to cover the first testing interface and a second testing interface cap configured to cover the second testing interface.

7. The electrical load receptacle of claim 1, wherein the first end includes an elbow providing an angle of 90 degrees of the first conductor receiving opening relative to the fuse.

8. The electrical load receptacle of claim 1, wherein the first end includes an interface compliant with standards set forth in Institute of Electrical and Electronics Engineers (IEEE) 386.

9. The electrical load receptacle of claim 1, wherein the load receptacle is compliant with standards set forth in American Society for Testing and Materials (ASTM) F855.

10. The electrical load receptacle of claim 1, wherein the outer shield and the insulative housing each comprise a separation configured to allow lateral displacement of the first end relative to the second end, and
- wherein the lateral displacement is sufficient to allow a maintenance worker to inspect and replace the fuse within the electrical load receptacle and subsequently re-assemble the electrical load receptacle by closing the separation of the outer shield and of the insulative housing.

11. A method for maintaining an electrical load receptacle having a first end electrically connected to a first end of a fuse, a second end electrically connected to a second end of the fuse, the method comprising:
- inserting a capacitive probe into a first testing interface on the first end to determine a first capacitance;
- inserting the capacitive probe into a second testing interface on the second end to determine a second capacitance; and
- determining a safety condition of the electrical load receptacle based on the first capacitance and the second capacitance.

12. The method of claim 11, further comprising determining a condition of the fuse based on the first capacitance and the second capacitance.

13. The method of claim 12, further comprising disconnecting the first end from the second end to expose a fuse, replacing the fuse with an operable fuse, and re-connecting the first end and the second end if the condition of the fuse is indicative of a failed fuse.

14. The method of claim 11, further comprising:

removing a grounding interface cap configured to cover a grounding interface arranged in the second end and electrically connected to a conductive connector in the second;

inserting a grounding pin into the grounding interface; and connecting an exposed portion of the grounding pin to ground.

* * * * *